United States Patent
Brook et al.

(10) Patent No.: US 9,756,089 B2
(45) Date of Patent: Sep. 5, 2017

(54) MAINTAIN PERSISTENT CONNECTIONS BETWEEN SERVERS AND MOBILE CLIENTS

(75) Inventors: Peter Daniel Brook, Seattle, WA (US); Mohit Talwar, Redmond, WA (US)

(73) Assignee: Facebook, Inc., Menlo Park, CA (US)

( * ) Notice: Subject to any disclaimer, the term of this patent is extended or adjusted under 35 U.S.C. 154(b) by 717 days.

(21) Appl. No.: 13/596,520

(22) Filed: Aug. 28, 2012

(65) Prior Publication Data

US 2014/0068038 A1    Mar. 6, 2014

(51) Int. Cl.
| | |
|---|---|
| *G06F 15/173* | (2006.01) |
| *H04L 29/06* | (2006.01) |
| *H04L 29/08* | (2006.01) |
| *H04W 76/04* | (2009.01) |
| *H04W 4/20* | (2009.01) |

(52) U.S. Cl.
CPC .... *H04L 65/1083* (2013.01); *H04L 29/08612* (2013.01); *H04W 76/045* (2013.01); *H04W 4/206* (2013.01)

(58) Field of Classification Search
CPC  H04L 41/0213; H04L 29/08072; H04L 29/06
See application file for complete search history.

(56) References Cited

U.S. PATENT DOCUMENTS

| | | | |
|---|---|---|---|
| 7,698,409 B2* | 4/2010 | Kohonen | 709/223 |
| 8,806,250 B2* | 8/2014 | Gatta et al. | 713/323 |
| 2005/0188098 A1* | 8/2005 | Dunk | 709/232 |
| 2007/0233855 A1* | 10/2007 | Brown et al. | 709/224 |
| 2007/0291659 A1* | 12/2007 | Strater et al. | 370/252 |
| 2008/0225865 A1* | 9/2008 | Herzog | 370/401 |
| 2012/0008536 A1* | 1/2012 | Tervahauta et al. | 370/311 |
| 2012/0110173 A1* | 5/2012 | Luna et al. | 709/224 |
| 2013/0007484 A1* | 1/2013 | Gobriel et al. | 713/320 |
| 2013/0060887 A1* | 3/2013 | Bradnick et al. | 709/217 |
| 2013/0067059 A1* | 3/2013 | Gatta et al. | 709/224 |
| 2014/0226562 A1* | 8/2014 | Shah et al. | 370/328 |

OTHER PUBLICATIONS

Chen, Kai-Hsiu et al., "Improving Service Availability in 3GPP Generic Access Network (GAN) by Adaptive Keep-alive Interval (AKI)," *2010 IEEE Wireless Communications and Networking Conference (WCNC)*, Apr. 2010.

* cited by examiner

*Primary Examiner* — Aaron Strange
*Assistant Examiner* — Timothy Sowa
(74) *Attorney, Agent, or Firm* — Baker Botts L.L.P.

(57) ABSTRACT

In one embodiment, a method includes iteratively waiting for a time interval; sending a keep-alive message from a first computing device to a second computing device; and incrementing a current value of the time interval when the first computing device receives from the second computing device a response to a current keep-alive message sent during the current iteration, until the first computing device does not receive from the second computing device any responses to the current keep-alive message sent during the current iteration; and setting the current value of the time interval to a previous value of the time interval from an immediately-previous iteration.

18 Claims, 3 Drawing Sheets

MAINTAIN PERSISTENT CONNECTIONS BETWEEN SERVERS AND MOBILE CLIENTS

TECHNICAL FIELD

This disclosure generally relates to maintaining persistent connections between clients and servers.

BACKGROUND

In a client-server system, a client may, from time to time, receive information or data from a server. There are two types of technologies for transmitting information or data between two devices (i.e., a sending device and a receiving device). On the one hand, the receiving device (e.g., the client) may pull the information or data from the sending device (e.g., the server). In this case, the request for the transmission is initiated by the receiving device. On the other hand, the sending device (e.g., the server) may push the information or data to the receiving device (e.g., the client). In this case, the request for the transmission is initiated by the sending device.

SUMMARY OF PARTICULAR EMBODIMENTS

In a client-server system, a server may need to, from time to time, send information to a client. For example, the information may be notifications, messages, software updates, application outputs, etc. One way for a client to receive the information from a server is for the server to push the information to the client. In particular embodiments, a persistent connection may be maintained between the client and the server so that the server is able to push the information to the client when appropriate.

In particular embodiments, the client may be a mobile device. To ensure that the connection between the mobile client and the server stays operational, the mobile client may, periodically, send keep-alive messages to the server.

In particular embodiments, a mobile client may determine a suitable or desirable time value for sending keep-alive messages to a server. The determination process may begin with an initial time value, t. The mobile client sends a keep-alive message to the server after time period t. If the mobile client receives a response from the server, which indicates that the connection between the mobile client and the server remains operational, the time value may be incremented by a value, n, such that t=t+n. The mobile client then sends another keep-alive message to the server after the new time period t. This process may be repeated and the time value may be gradually incremented until the mobile client does not receive any responses from the server after sending a keep-alive message to the server. Then, the previous time value from the previous iteration, where the mobile client has received a response from the server, is used by the mobile client as the time interval for sending keep-alive messages to the server.

In particular embodiments, after determining a time value for sending keep-alive messages to the server, the mobile client may, from time to time, adjust the time value (e.g., increase or decrease the time value) in order to accommodate for changes in the network conditions.

In particular embodiments, the time values for sending keep-alive messages, as determined by multiple mobile clients in a client-server system, may be aggregated to determine a suitable time value for the client-server system. This time value may then be used as the initial time value for individual mobile clients to determine their respective time values for sending keep-alive message to servers.

DESCRIPTION OF EXAMPLE EMBODIMENTS

In a client-server network system, a client may send or receive information to or from a server from time to time over a communications or network connection between the client and the server. When receiving information from the server, the client may pull the information from the server; or alternatively, the server may push the information to the client. In the case of the client pulling the information from the server, in order to determine whether there is information available that needs to be sent from the server to the client, the client needs to send inquiries to the server periodically, asking the server whether there is new information available to be pulled from the server. Sending such inquiries to the server periodically may be resource consuming on the part of the client, especially for mobile clients (e.g., draining a mobile device's power). In the case of the server pushing the information to the client, a persistent connection needs to be maintained between the client and the server so that the server can send the information to the client when appropriate (e.g., when information becomes available).

Figure 1:
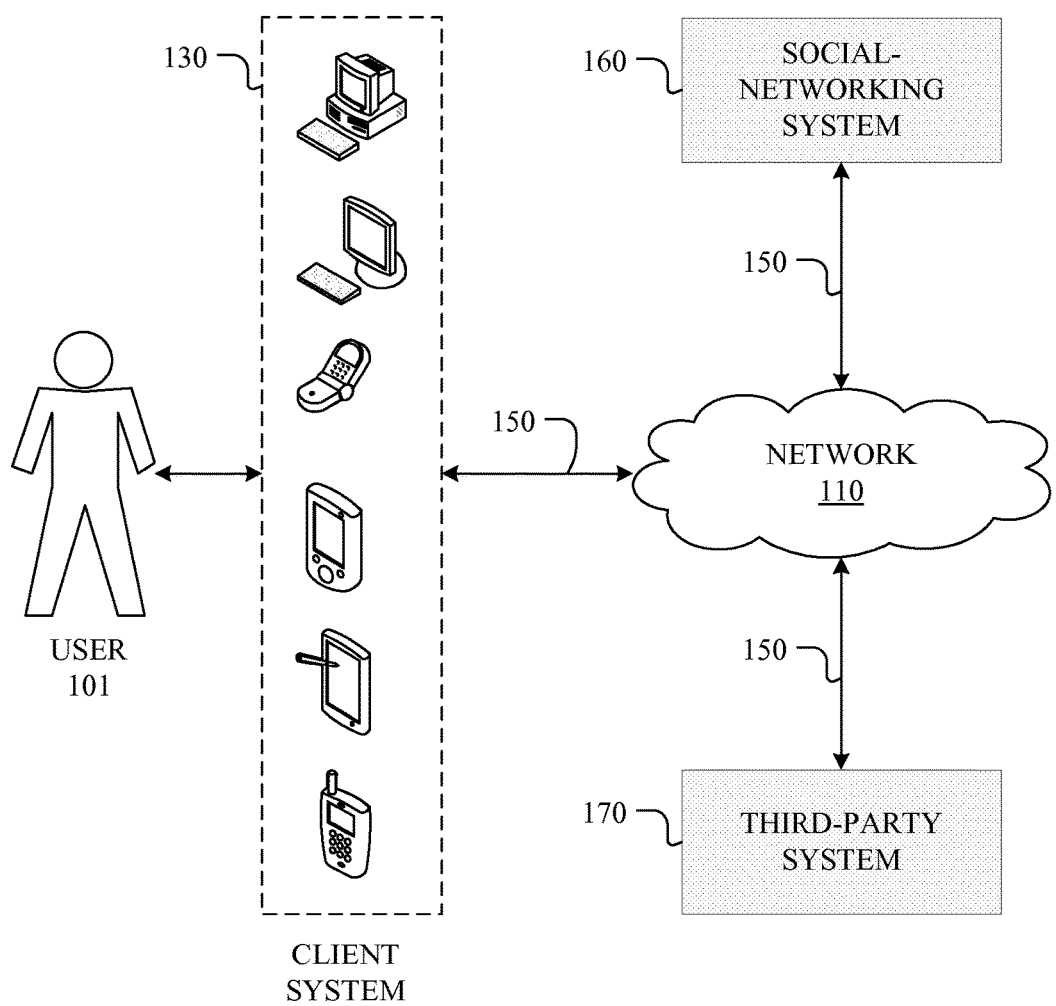
FIG. 1 illustrates an example network environment associated with a social-networking system.

In particular embodiments, a client-server network system may implement a social-networking system. FIG. 1 illustrates an example network environment 100 associated with a social-networking system. Network environment 100 includes a user 101, a client system 130, a social-networking system 160, and a third-party system 170 connected to each other by a network 110. Although FIG. 1 illustrates a particular arrangement of user 101, client system 130, social-networking system 160, third-party system 170, and network 110, this disclosure contemplates any suitable arrangement of user 101, client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of users 101, client systems 130, social-networking systems 160, third-party systems 170, and networks 110, this disclosure contemplates any suitable number of users 101, client systems 130, social-networking systems 160, third-party systems 170, and networks 110. As an example and not by way of limitation, network environment 100 may include multiple users 101, client system 130, social-networking systems 160, third-party systems 170, and networks 110.

In particular embodiments, user 101 may be an individual (human user), an entity (e.g., an enterprise, business, or third-party application), or a group (e.g., of individuals or entities) that interacts or communicates with or over social-networking system 160. In particular embodiments, social-networking system 160 may be a network-addressable computing system hosting an online social network. Social-networking system 160 may generate, store, receive, and transmit social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include an authorization server that allows users 101 to opt in or opt out of having their actions logged by social-networking system 160 or shared with other systems (e.g., third-party systems 170), such as, for example, by setting appropriate privacy settings. In particular embodiments, third-party system 170 may be a network-addressable computing system that can host applications implemented by third-party system 170. Third-party system 170 may generate, store, receive, and transmit various types of information. Third-party system 170 may be accessed by the other components of network environment 100 either directly or via network 110. In particular embodiments, one or more users 101 may use one or more client systems 130 to access, send data to, and receive data from social-networking system 160 or third-party system 170. Client system 130 may access social-networking system 160 or third-party system 170 directly, via network 110, or via a third-party system. As an example and not by way of limitation, client system 130 may access third-party system 170 via social-networking system 160. Client system 130 may be any suitable computing device, such as, for example, a personal computer, a laptop computer, a cellular telephone, a smartphone, or a tablet computer.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, a client may be a mobile device, such as a smartphone or a tablet computer. The mobile client may connect to network 110 or servers of social-networking system 160 via a wireless connection.

In particular embodiments, information, such as messages, notifications, software updates, and application outputs, may be sent from one device (e.g., a server) to another device (e.g., a mobile client). More specifically, the server may push the information to the mobile client at appropriate times, such as when information becomes available. In particular embodiments, a persistent connection may be established and maintained between a server and a mobile client so that the server can push information to the mobile client via the connection as needed. A persistent connection is a Transmission Control Protocol (TCP) connection between two devices used to send multiple communication packages from one device to another device, as opposed to establishing a new connection for each and every communication package.

In particular embodiments, in order to maintain a persistent connection between a server and a mobile client, the mobile client may send keep-alive messages to the server periodically (e.g., sending a keep-alive message every t minutes) to verify that the connection between the server and the mobile client remains operationally or to prevent the connection from being broken. The keep-alive message may also be referred to as keep-alive signal or keep-alive package. Upon receiving such a message, the server may send a reply to the mobile client in response, thus indicating to the mobile client that the connection between the server and the mobile client is still alive and operational.

Sending keep-alive messages to the server consumes resources on the part of the mobile client (e.g., power or processor). To reduce resource consumption on the part of the mobile client, it is desirable that the mobile client sends keep-alive messages to the server as infrequently as possible. On the other hand, if the time gap between two keep-alive messages is too long, the connection between the server and the mobile client may be broken.

Figure 2:
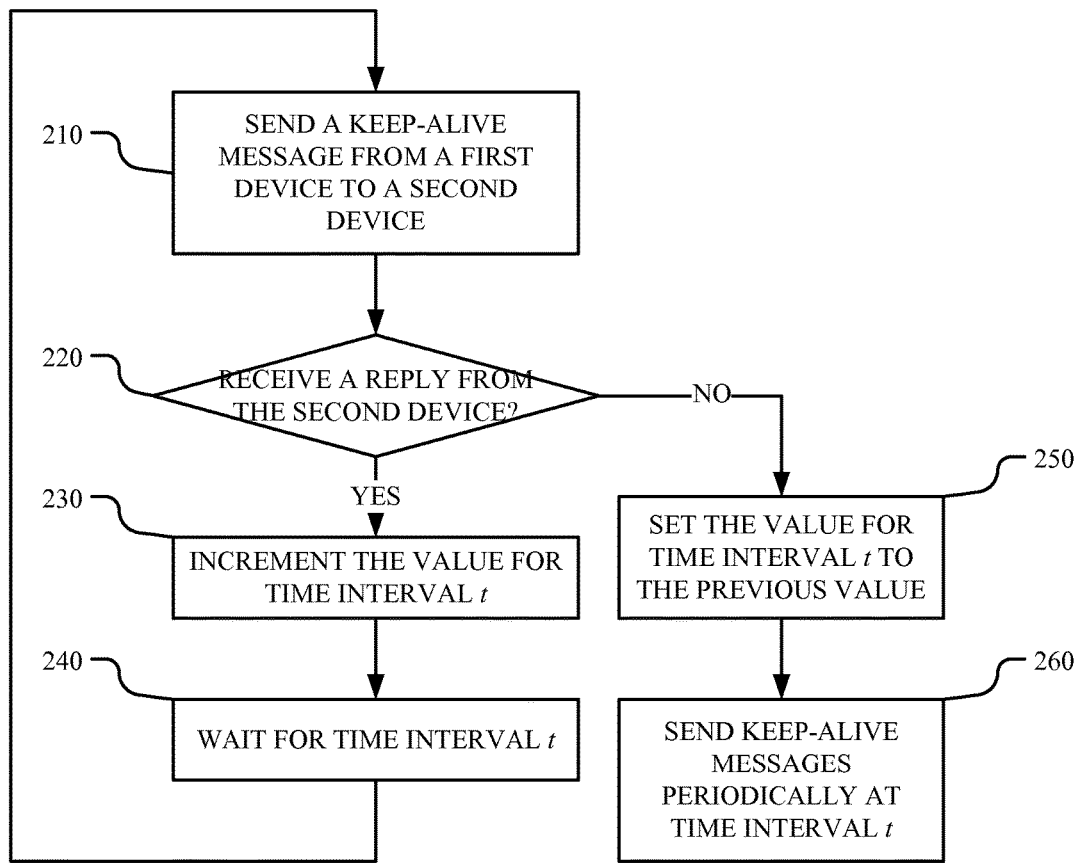
FIG. 2 illustrates an example method for determining a time value for sending keep-alive messages.

In particular embodiments, a suitable time value may be determined for periodically sending keep-alive messages from a mobile client to a server such that the keep-alive messages are sent infrequently or as infrequently as possible while still maintaining the connection between the server and the mobile client alive and operational. FIG. 2 illustrates an example method 200 for determining a time value for sending keep-alive messages from a mobile client to a server to maintain a persistent connection between the mobile client and the server.

Method 200 may begin at step 210, where an initial time value t (e.g., t=5 minutes) is selected for sending keep-alive messages from a first device (e.g., a mobile client) to a second device (e.g., a server). Thus, after time period t has passed, the first device sends a keep-alive message to the second device. At step 220, if the second device sends a reply to the first device in response to the keep-alive message, the current time value t may be incremented at step 230. As an example, the time value t may be incremented by a constant value c (e.g., c=1 minute) each time, such that t=t+c. As another example, the time value may be doubled each time, such that t=t*2. At step 240, the first device then waits for a time period of the new time value t to pass. Then, the process returns to step 210, where the first device sends another keep-alive message to the second device.

If, on the other hand, at step 220, the first device does not receive a response from the second device after sending a keep-alive message to the second device, this suggests that the time gap between the last two keep-alive messages is too long (i.e., the time value t is too large). Thus, at step 250, the time value t may be set to the previous value where the first device has received a response from the second device. Thereafter, at step 260, the first device may send keep-alive messages to the second device periodically at each time interval t (e.g., sending a keep-alive message once every t minutes).

To further explain method 200, consider a specific example. Suppose that a persistent connection is to be maintained between a server and a mobile client so that the server may push information to the mobile client when needed. The mobile client may send keep-alive messages to the server periodically, at a specific time interval t. To determine a suitable value for the time interval t, an initial value for t may be selected. For example, the initial value for t may be 5 minutes. The mobile client may wait for 5 minutes and then send a keep-alive message to the server.

It is possible that the initial value selected for the time interval t is already too large. In this case, the mobile client does not receive any response from the server. The mobile client may need to decrement the value for t, and then repeat the process. On the other hand, if the mobile client does receive a reply from the server in response to the first keep-alive message, the value for t may be incremented. For example, the value for t may be doubled, so that the new value for t is now 10 minutes. The mobile client may wait for 10 minutes and then send a second keep-alive message to the server.

Suppose that the mobile client again receives a reply from the server in response to the second keep-alive message, the value for t may again be double. The new value for t is now 20 minutes. The mobile client may wait for 20 minutes and then send a third keep-alive message to the server.

This time, suppose that the mobile client does not receive any responses from the server. This indicates that the current value for t (i.e., 20 minutes) is too long to wait for sending keep-alive messages. The value for t may be returned to the previous value (i.e., 10 minutes), where the mobile client has received a response from the server for the second keep-alive message.

Between 10 minutes where there is a reply to the keep-alive message and 20 minutes where there is no reply to the keep-alive message, there is a relatively large range. Optionally, the value for t may be further fine-tuned. For example, starting from the value of 10 minutes, the mobile client may increment the value for t by a constant value (e.g., 1 minute) so that the new value for t is now 11 minutes. The mobile client may wait for 11 minutes and then send another keep-alive message to the server. If the mobile client receives a reply from the server, the value for t may again be incremented for another 1 minute so that the new value for t is now 12 minutes. The mobile client may wait for 12 minutes and then send yet another keep-alive message to the server. This process may be repeated until the mobile client does not receive a reply to the last-sent keep-alive message. Suppose that at this point the current value for t is 17 minutes. The value for t may be returned to the previous value (i.e., 16 minutes), where the mobile client has received a response from the server for the corresponding keep-alive message.

This value thus determined for t (i.e., 16 minutes) may then be used as the time interval for sending keep-alive messages from the mobile client to the server. Thereafter, the mobile client may send a keep-alive message to the server once every 16 minutes.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Network conditions may change from time to time. For example, the volume of network traffic may differ at different times. Such changes in network conditions may affect the time intervals for sending keep-alive messages. In particular embodiments, after a mobile client has determined a time interval for sending keep-alive messages to a server, the mobile client may, from time to time, adjust the time interval (e.g., to accommodate for the changes in network conditions).

Method 200 may be repeated to determine a new time interval. However, the previously determined time interval may be used as the initial value for t. For example, suppose that the mobile client has previously determined that 16 minutes is a suitable time interval for sending keep-alive messages to the server. Some time thereafter, the mobile client may increment the value for t by a constant value (e.g., 1 minute) so that the new value for t is now 17 minutes. The mobile client may wait for 17 minutes and then send a keep-alive message to the server. Due to the changes in network conditions, the mobile device may receive a reply from the server this time. The mobile device may then increment the value for t to 18 minutes, wait for 18 minutes, and then send another keep-alive message. The process may be repeated until the mobile device does not receive a response to the last-sent keep-alive message. Suppose that the current value for t is 24 minutes. At this point, the value for t may be returned to the previous value (e.g., 23 minutes) where a response has been received. Thereafter, this new value for t (i.e., 23 minutes) may be used as the time interval for sending keep-alive messages (e.g., until another adjustment is made to the t value).

Conversely, some time after a mobile client has determined a time interval for sending keep-alive messages to a server, that time interval may become too long due to changes in the network conditions. In this case, the time interval may be decremented accordingly. For example, suppose that the mobile client has previously determined that 16 minutes is a suitable time interval for sending keep-alive messages to the server. However, some time thereafter, the mobile client does not receive a reply to the last-sent keep-alive message. In this case, the value for t may be decremented by a constant value (e.g., 1 minute) so that the new value for t is now 15 minutes. The mobile client may wait for 15 minutes and then send a keep-alive message to the server. If the mobile client still does not receive any responses, the value for t may need to be further decremented, until a response is received from the server for the corresponding keep-alive message. Thereafter, this new value for t (i.e., 9 minutes) may be used as the time interval for sending keep-alive messages.

In particular embodiments, the suitable time interval values for sending keep-alive messages determined by multiple mobile clients may be aggregated. For example, each mobile client may send the time interval values it has determined at different times to a server, and the server may store the values received from all the mobile clients. The values from the different mobile clients may be analyzed to, for example, estimate the conditions of a specific network.

As an example, suppose that a set of mobile clients communicate over a 3G network. The time interval values determined by these mobile clients may be specifically suitable for the 3G network. Thereafter, if a new mobile client needs to determine a time interval for periodically sending keep-alive messages, the average or median value of the time interval values determined by the other mobile clients on the 3G network may be used as the initial value for t for the new mobile client. The new mobile client may then adjust the initial value for t (e.g., using method 200) to determine a time interval value more suitable for itself.

As another example, often, network usage (e.g., traffic volume, bandwidth) may vary depending on time of day or day of week. Thus, the time interval values as determined by mobile clients may also vary depending on time of day or day of week. Given a specific time period, the average or median value of the time interval values determined by the mobile clients during that time period may be determined. There may be a specific time interval value suitable for normal business hours (e.g., from 8:00 am to 6:00 pm) while another time interval value suitable for evenings (e.g., after 7:00 pm). For a mobile device that needs to send keep-alive messages to a server, depending on when the keep-alive messages are to be sent, the time interval value for that time period may be selected as the initial value for t. From there, the mobile device may then adjust the initial value for t (e.g., using method 200) to determine a time interval value more suitable for itself.

Figure 3:
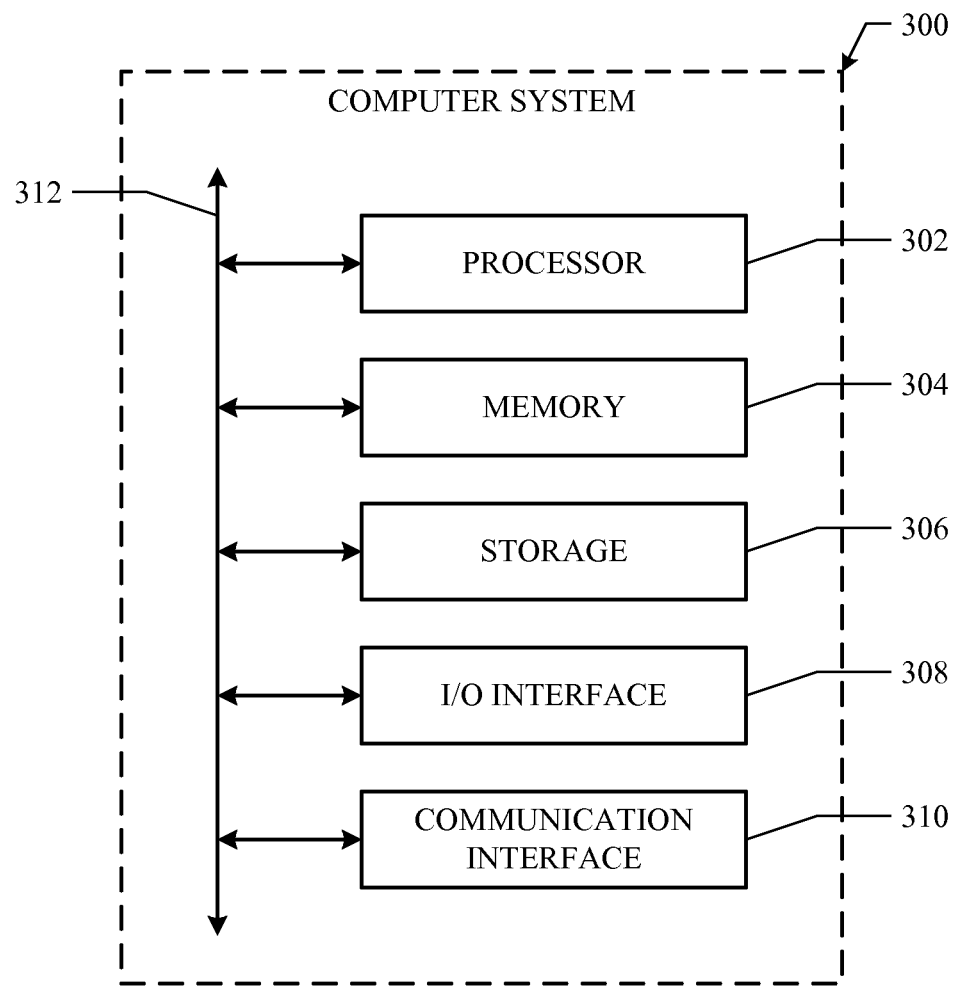
FIG. 3 illustrates an example computer system.

In particular embodiments, methods 200 may be implemented as computer software and executed on a computer system (e.g., a mobile client). FIG. 3 illustrates an example computer system 300. In particular embodiments, one or more computer systems 300 perform one or more steps of one or more methods described or illustrated herein. In particular embodiments, one or more computer systems 300 provide functionality described or illustrated herein. In particular embodiments, software running on one or more computer systems 300 performs one or more steps of one or more methods described or illustrated herein or provides functionality described or illustrated herein. Particular embodiments include one or more portions of one or more computer systems 300. Herein, reference to a computer system may encompass a computing device, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
determining an initial value for a time interval for sending keep-alive messages from a client computing device connected to a server computing device on a particular one of a plurality of generations of cellular data connection, wherein the time interval is based on an average value or a median value of keep-alive message time interval values determined from previous connections between the server computing device and one or more other computing devices different from the client computing device on the particular one of the plurality of generations of cellular data connection; and
iteratively:
waiting for the time interval;
sending a keep-alive message from the client computing device to the server computing device; and
incrementing a current value of the time interval when the client computing device receives from the server computing device a response to a current keep-alive message sent during a current iteration, until the client computing device does not receive from the server computing device any responses to the current keep-alive message sent during the current iteration; and
setting the current value of the time interval to a previous value of the time interval from an immediately-previous iteration.

2. The method of claim 1, wherein:
the client computing device is a mobile client associated with a user of a social network; and
the server computing device is a server associated with the social network.

3. The method of claim 1, wherein incrementing the current value of the time interval comprises adding a constant value to the current value of the time interval.

4. The method of claim 1, wherein incrementing the current value of the time interval comprises doubling the current value of the time interval.

5. The method of claim 1, further comprising iteratively:
waiting for the time interval;
sending the keep-alive message from the client computing device to the server computing device; and
decrementing the current value of the time interval when the client computing device does not receive from the server computing device any responses to the current keep-alive message sent during the current iteration, until the client computing device receives from the server computing device the response to the current keep-alive message sent during the current iteration.

6. The method of claim 1, further comprising periodically sending keep-alive messages from the client computing device to the server computing device at each time interval to maintain a persistent connection between the client computing device and the server computing device.

7. The method of claim 1, wherein determining the initial value for the time interval is further based on a day or time at which the keep-alive message time interval values were determined for the connections between the server computing device and the one or more other computing devices.

8. One or more computer-readable non-transitory storage media embodying software that is operable when executed to:
determine an initial value for a time interval for sending keep-alive messages from a client computing device connected to a server computing device on a particular one of a plurality of generations of cellular data connection, wherein the time interval is based on an average value or a median value of keep-alive message time interval values determined from previous connections between the server computing device and one or more other computing devices different from the client computing device on the particular one of the plurality of generations of cellular data connection; and
iteratively:
wait for the time interval;
send a keep-alive message from the client computing device to the server computing device; and
increment a current value of the time interval when the client computing device receives from the server computing device a response to a current keep-alive message sent during a current iteration, until the client computing device does not receive from the server computing device any responses to the current keep-alive message sent during the current iteration; and
set the current value of the time interval to a previous value of the time interval from an immediately-previous iteration.

9. The media of claim 8, wherein:
the client computing device is a mobile client associated with a user of a social network; and
the server computing device is a server associated with the social network.

10. The media of claim 8, wherein increment the current value of the time interval comprises add a constant value to the current value of the time interval.

11. The media of claim 8, wherein increment the current value of the time interval comprises double the current value of the time interval.

12. The media of claim 8, wherein the software is further operable when executed to
iteratively:
wait for the time interval;
send the keep-alive message from the client computing device to the server computing device; and decrement the current value of the time interval when the client computing device does not receive from the server computing device any responses to the current keep-alive message sent during the current iteration, until the client computing device receives from the server computing device the response to the current keep-alive message sent during the current iteration.

13. The media of claim 8, wherein the software is further operable when executed to periodically send keep-alive messages from the client computing device to the server computing device at each time interval to maintain a persistent connection between the client computing device and the server computing device.

14. A client computing device comprising:
one or more processors; and
a memory coupled to the processors comprising instructions executable by the processors, the processors operable when executing the instructions to:
determine an initial value for a time interval for sending keep-alive messages from a client computing device connected to a server computing device on a particular one of a plurality of generations of cellular data connection, wherein the time interval is based on an average value or a median value of keep-alive message time interval values determined from previous connections between the server computing device and one or more other computing devices different from the client computing device on the particular one of the plurality of generations of cellular data connection; and
iteratively:
wait for the time interval;
send a keep-alive message from the client computing device to the server computing device; and
increment a current value of the time interval when the client computing device receives from the server computing device a response to a current keep-alive message sent during the current iteration, until the client computing device does not receive from the server computing device any responses to a current keep-alive message sent during the current iteration; and
set the current value of the time interval to a previous value of the time interval from an immediately-previous iteration.

15. The client computing device of claim 14, wherein:
the client computing device is a mobile client associated with a user of a social network; and
the server computing device is a server associated with the social network.

16. The client computing device of claim 14, wherein increment the current value of the time interval comprises add a constant value to the current value of the time interval.

17. The client computing device of claim 14, wherein increment the current value of the time interval comprises double the current value of the time interval.

18. The client computing device of claim 14, wherein the processors are further operable when executing the instructions to
iteratively:
wait for the time interval;
send the keep-alive message from the client computing device to the server computing device; and
decrement the current value of the time interval when the client computing device does not receive from the server computing device any responses to the current keep-alive message sent during the current iteration, until the client computing device receives from the server computing device the response to the current keep-alive message sent during the current iteration.

* * * * *